United States Patent [19]

Yates, III

[11] Patent Number: 5,237,005
[45] Date of Patent: Aug. 17, 1993

[54] POLYPHENYLENE ETHER-POLYESTER RESIN COMPOSITIONS

[75] Inventor: John B. Yates, III, Glenmont, N.Y.

[73] Assignee: General Electric Company, Pittsfield, Mass.

[21] Appl. No.: 589,871

[22] Filed: Sep. 28, 1990

[51] Int. Cl.⁵ .................. C08L 67/02; C08L 71/12
[52] U.S. Cl. ...................... 525/92; 525/396; 525/397; 525/905
[58] Field of Search .................. 525/92, 396, 397, 905

[56] References Cited

U.S. PATENT DOCUMENTS

| 4,283,503 | 8/1981 | Wright | 525/905 |
|---|---|---|---|
| 4,716,199 | 12/1987 | van der Meer | 525/905 |
| 4,732,937 | 3/1988 | Sybert | 525/92 |
| 4,918,145 | 4/1990 | Dougherty et al. | 525/314 |
| 5,010,144 | 4/1991 | Phanstiel | |
| 5,013,790 | 5/1991 | Tung et al. | 525/98 |
| 5,041,504 | 8/1991 | Brown et al. | 525/905 |
| 5,089,566 | 2/1992 | Brown | |
| 5,096,979 | 3/1992 | Brown et al. | 525/905 |

FOREIGN PATENT DOCUMENTS

| 0347827 | 12/1989 | European Pat. Off. |
| 0347828 | 12/1989 | European Pat. Off. |
| 0349717 | 1/1990 | European Pat. Off. |

*Primary Examiner*—James J. Seidleck
*Assistant Examiner*—Hamilton, III: Thomas

[57] ABSTRACT

Compositions containing thermoplastic polyester resin and polyphenylene ether resin capped with an epoxy-triazine compound are described. The compositions also include linear, tapered, block copolymers.

22 Claims, No Drawings

POLYPHENYLENE ETHER-POLYESTER RESIN COMPOSITIONS

Thermoplastic compositions are described herein, with particular emphasis on polyphenylene ether-polyester compositions which are characterized by many advantageous properties.

Blends of polyphenylene ethers and thermoplastic polyesters are generally attractive for some applications because they exhibit the heat resistance and dimensional stability of the polyphenylene ether (also known as "PPE", or as polyphenylene oxide), while also exhibiting the solvent resistance of crystalline-type polyesters.

Since PPE resins and thermoplastic polyesters are somewhat incompatible, various methods have been developed for increasing their compatibility. For example, a polycarbonate-based material is used as a compatibilizer in U.S. Pat. No. 4,806,297 of S. B. Brown and J. B. Yates, III. As another example, S. B. Brown discloses the capping of PPE with various epoxytriazine compounds, which also results in enhanced compatibility with polyesters, as described in U.S. patent application Ser. No. 351,905, filed on May 15, 1989 U.S. Pat. No. 5,096,979.

The compatibilized PPE/polyester materials are very useful for preparing molded parts which must exhibit a high level of impact strength, flexibility, and resistance to solvents such as gasoline. Examples of such parts are housings and other components used to make lawn-care equipment, as well as automotive parts, e.g., doors and fenders.

While the PPE/polyester materials presently available exhibit many excellent properties as described above, continued improvements in performance are required for various product applications. Illustrative properties which often must be enhanced include tensile elongation and ductility. Furthermore, this enhancement cannot be gained at the expense of other necessary properties, such as tensile and impact strength, flexural modulus, and melt flow.

The need for improved PPE/polyester blends is therefore apparent. Such materials should have good tensile elongation while also substantially maintaining other important properties, such as chemical resistance, tensile strength, impact strength, and melt flow.

SUMMARY OF THE INVENTION

The present invention, a direct result of the product requirements discussed above, is an improved thermoplastic composition comprising:

A) polyphenylene ether resin capped with an epoxytriazine compound;
B) thermoplastic polyester resin; and
C) a linear, tapered, block copolymer.

Some embodiments of this invention can also include various elastomeric components, as further described below.

DETAILED DESCRIPTION OF THE INVENTION

Polyphenylene ethers suitable for component A are well-known in the art, and are described, for example, in U.S. Pat. Nos. 3,306,874; 3,306,875; and 3,432,469 of Allan Hay; U.S. Pat. Nos. 3,257,357 and 3,257,358 of Gelu Stamatoff; U.S. Pat. No. 4,806,602 of Dwain M. White et al.; and U.S. Pat. No. 4,806,297 of Sterling B. Brown et al., all incorporated herein by reference. Both homopolymer and copolymer polyphenylene ethers are within the scope of this invention.

The preferred PPE resins are homo- and copolymers which comprise a plurality of structural units of the formula

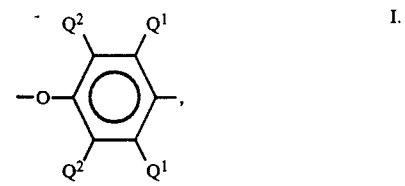

wherein each $Q^1$ is independently halogen, primary or secondary lower alkyl, phenyl, haloalkyl, aminoalkyl, hydrocarbonoxy, or halohydro-carbonoxy, wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$.

Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-, 3- or 4-methylpentyl, and the corresponding heptyl groups. Examples of secondary lower alkyl groups are isopropyl, sec-butyl and 3-pentyl. Preferably, any alkyl radicals are straight chain, rather than branched. Often, each $Q^1$ is alkyl or phenyl, especially $C_{1-4}$ alkyl, and each $Q^2$ is hydrogen.

Especially preferred polyphenylene ethers will be comprised of units derived from 2,6-dimethyl phenol. Also preferred in some instances are PPE copolymers comprised of units derived from 2,6-dimethyl phenol and 2,3,6-trimethyl phenol.

This invention also includes within its scope PPE resins which contain certain moieties which modify properties such as molecular weight, melt viscosity, or impact strength. For example, vinyl monomers and vinylaromatic compounds may be grafted onto the PPE polymer, as described, for example, in the application of Sterling B. Brown et al., U.S. Ser. No. 351,903, filed May 15, 1989 now U.S. Pat. No. 5,089,566, the entire contents of which are incorporated herein by reference.

As another example, coupled PPE polymers may also be used, in which the coupling agent is reacted with hydroxy groups of two PPE chains to produce a higher molecular weight polymer.

The PPE resins of this invention generally have a weight average molecular weight of about 20,000 to 80,000, as determined by gel permeation chromatography.

Furthermore, they can be prepared by methods known in the art: for example, oxidative coupling of an appropriate monohydroxyaromatic compound in the presence of a catalyst based on copper, manganese, or cobalt.

As mentioned above, the PPE polymer of this invention is capped (i.e., functionalized) with an epoxytriazine compound, as described in the application of Sterling B. Brown et al., U.S. Ser. No. 351,905, filed May 15, 1989, now U.S. Pat. No. 5,096,979 the entire contents of which are incorporated herein by reference. This type of capped polymer contains end groups of the formula

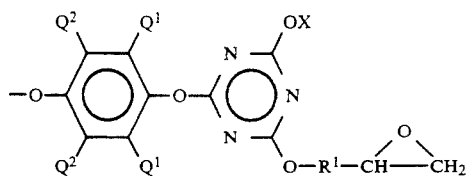

wherein $Q^1$ and $Q^2$ are as described above, X is an alkyl, cycloalkyl, aromatic group, or

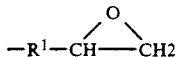

$R^1$ is a divalent aliphatic, alicyclic, heterocyclic, or substituted or unsubstituted aromatic hydrocarbon group.

The epoxytriazine-capped PPE materials may be prepared in solution by reacting at least one PPE polymer with a compound of the formula

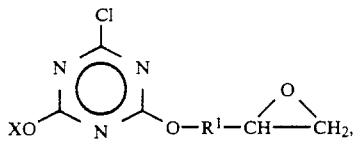

$R^1$ and X having been defined above.

The reaction can be carried out in the presence of a basic reagent such a pyridine.

Examples of epoxychlorotriazines conforming to Formula IV and suitable for this invention are the following:
2-chloro-4,6-diglycidoxy-1,3,5-triazine, also known as diglycidyl chlorocyanurate ("DGCC");
2-chloro-4-(n-butoxy)-6-glycidoxy-1,3,5-triazine, also known as n-butyl glycidyl chlorocyanurate ("BGCC"); and
2-chloro-4-(2,4,6-trimethylphenoxy)-6-glycidoxy-1,3,5-triazine, also known as mesityl glycidyl chlorocyanurate ("MGCC").

Suitable methods for the preparation of these epoxychlorotriazines are known in the art and described, for example in U.S. Pat. No. 4,895,945 of Sterling B. Brown et al., the contents of which are incorporated herein by reference. As an illustration, 2,4,6-trichlorotriazine may be reacted with glycidol or combinations of glycidol with n-butanol or mesitol.

Usually, about 1-20% by weight epoxychlorotriazine is used for capping, based on the amount of PPE employed. The basic reagent is present in an amount effective to promote the reaction, usually about 0.5 to 5 equivalents per mole of chloroepoxytriazine.

As an alternative to the solution method, an interfacial technique may be used to prepare the epoxychlorotriazine-capped PPE polymers, wherein the reaction is carried out in the presence of water, a water-soluble base such as sodium hydroxide, and a phase transfer catalyst such as a tetra-alkylammonium chloride compound. This technique is sometimes preferred because it results in a relatively low level of chemically-bound chlorine in the product.

The capped PPE polymers may be isolated by conventional techniques, such as precipitation with a nonsolvent.

As mentioned above, the composition of this invention includes at least one thermoplastic polyester, Component B.

The choice of a particular thermoplastic polyester is not critical to this invention; many of them contain structural units of the formula

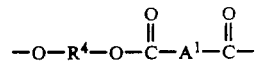

wherein each $R^4$ is independently a divalent aliphatic, alicyclic, aromatic hydrocarbon, or polyoxyalkylene group; and $A^1$ is a divalent aromatic group.

Examples of suitable polyesters containing the structures of Formula V are poly(alkylene dicarboxylates), elastomeric polyesters, polyarylates, and polyester copolymers such as copolyestercarbonates. Furthermore, it is sometimes desirable that the polyester has a relatively high carboxylic end group concentration, e.g., about 5-250 microequivalents per gram or, more preferably, about 20-70 microequivalents per gram.

Polyesters for the present invention sometimes include structural units of the formula

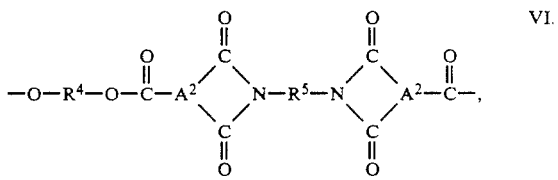

wherein $R^4$ is as previously defined, $R^5$ is a polyoxyalkylene group, and $A^2$ is a trivalent aromatic group.

The $A^1$ group in Formula V is usually p- or m-phenylene, or a mixture thereof, and $A^2$ in Formula VI is usually derived from trimellitic acid, and has the structure

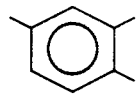

The poly(alkylene terephthalates) are often the preferred polyesters for the present invention, with poly(ethylene terephthalate) (PET) and poly(butylene terephthalate) (PBT) being the most preferred members of this class. Mixtures of PET and PBT are also sometimes very suitable.

Examples of polyalkylene terephthalates are also provided in the following U.S. Pat. Nos.: 4,902,753; 4,128,526; 3,953,394; 3,671,487; 3,047,539; 2,822,348; 2,727,881; 2,720,502; and 2,465,319, the entire contents of all of these patents being incorporated herein by references.

The polyester generally has a number-average molecular weight in the range of about 20,000 to 70,000, as determined by intrinsic viscosity at 30° C. in a mixture of 60% phenol and 40% 1,1,2,2-tetrachloroethane (by weight). Methods for the preparation of polyesters described herein are generally well known in the art.

The relative amounts of PPE and polyester used for this invention are not particularly critical; they are dictated mainly by the types of properties desired for the overall composition. Usually, each polymer is employed at a level in the range of about 15% by weight to about 70% by weight, based on the weight of the entire composition. In preferred embodiments, the weight ratio of capped PPE polymer to thermoplastic polyester ranges from about 60:40 to about 20:80.

Various conventional procedures may be employed to mix the capped PPE resin with the thermoplastic polyester, as described below. Solution or melt-blending techniques are usually used. Reaction temperatures are in the range of about 175°-350° C.

The blending of the capped PPE and the polyester under reactive conditions results in the formation of some PPE-polyester copolymer, which is within the scope of the present invention. Any copolymer formation resulting from this blending is referred to as "PPE-polyester copolymer". Thus, the compositions of this invention can include PPE-polyester copolymer, as well as various proportions of PPE and polyester homopolymers.

Component C is a tapered linear block copolymer, and generally comprises blocks of $A^1$ and $B^1$, wherein $A^1$ is a polymerized vinyl aromatic hydrocarbon block, and $B^1$ is a hydrogenated, partially hydrogenated, or non-hydrogenated block derived from at least one polymerized conjugated diene.

Those of ordinary skill in the polymer arts understand the concept of "tapering". Furthermore, techniques for achieving tapered polymers or copolymers are well-known in the art. Examples of references which relate to tapered polymers are U.S. Pat. Nos. 4,948,832; 4,939,207; 4,918,145; 4,914,248; 4,913,971; and 4,116,917, all of which are incorporated herein by reference.

Component C usually contains about 50% by weight to about 90% by weight vinyl aromatic polymer, based on the total weight of the component. In preferred embodiments, 70% by weight to about 80% by weight vinyl aromatic polymer is present. The weight-average molecular weight of the entire copolymer is preferably from about 90,000 to about 270,000, and most preferably, in the range of about 110,000 to about 150,000.

The vinyl aromatic polymer of Component C is preferably in a form which includes both random and block structural units, with the weight ratio of random to block usually being in the range of about 1.5:1 to about 4:1, and more preferably, within the range of about 2.5:1 to about 3:1. Some of the suitable materials of this type contain a block of the vinyl aromatic polymer having a molecular weight of about 10,000 to about 30,000, followed by a block of the polymerized conjugated diene having a molecular weight of about 25,000 to about 65,000, which itself is linked to a random block of vinyl aromatic-conjugated diene polymer (for example, a random block of styrene-butadiene), having a molecular weight of about 30,000 to about 50,000. The random block may be attached at its opposite end to another vinyl aromatic polymeric block, usually having a molecular weight of about 30,000 to about 50,000.

In some preferred embodiments, the $A^1$ block of Component C is derived from a monomer selected from the group consisting of styrene, alpha-methyl styrene, para-methyl styrene, vinyl toluene, vinyl xylene, and combinations of such monomers. The $B^1$ block is preferably derived from a monomer selected from the group consisting of butadiene, isoprene, ethylene, butylene, 1,3-pentadiene, 2,3-dimethyl butadiene, and combinations thereof. It is also possible that Component C can contain more than one type of $A^1$ and/or $B^1$ block.

Tapered linear styrene-butadiene-styrene (SBS) "triblock" copolymers falling within the molecular weight ranges described above are especially suitable for use as Component C. An example of such a material is FINA-CLEAR TM 520, a commercially available product available from Fina Oil and Chemical Company.

A suitable level of Component C depends on several factors, such as the end use of the product, the level of impact strength desired, and the particular type and characteristics of other components which are present.

Usually, about 1% by weight to about 20% by weight of Component C is used, based on the weight of the entire composition. Preferably, the level is about 5% by weight to about 15% by weight.

In some embodiments, compositions of the present invention are further enhanced by the inclusion of an elastomeric material, such as elastomeric block copolymers and mixtures thereof. They are usually used at levels ranging from about 1% by weight to about 30% by weight, based on the weight of the entire composition, as further described below.

Examples of suitable materials include various diblock or triblock copolymers characterized by an A-B, A-B-A', or (A-B)$_m$-X structure, or mixtures of these structures, wherein A and A' are each polymerized vinyl aromatic hydrocarbon blocks, each B is derived from at least one polymerized conjugated diene, X is the radical of a multifunctional coupling agent, and m is an integer of at least 2. These types of materials are well-known in the art, and frequently comprise blocks of polystyrene and either polyisoprene or polybutadiene. The polybutadiene or polyisoprene may be completely-, partially-, or non-hydrogenated. Some examples of suitable block copolymers are provided in U.K. Patent No. 1,264,741, and in U.S. Pat. Nos. 3,078,254; 3,149,182; 3,231,635; 3,265,765; 3,287,333; 3,297,793; 3,462,162; 3,594,452; 3,595,942; 3,694,523; 3,842,029; 4,402,159; 4,755,566; 4,874,810; 4,889,889; 4,900,786; and 4,935,472; all of which are incorporated herein by reference.

Some specific examples of block copolymers are: polystyrene-polybutadiene; polystyrene-polyisoprene; polystyrene-polybutadiene-polystyrene; and polystyrene-polyisoprene-polystyrene. As mentioned above, hydrogenated versions of these materials are also possible, e.g., styrene-ethylene-butylene-styrene block copolymers, styrene-ethylene-propylene block copolymers, and the like.

Another type of elastomeric material which may be included in these compositions is a radial teleblock copolymer which contains segments or "blocks" which themselves comprise a conjugated diene polymer, vinyl aromatic polymer blocks, and a coupling agent. These materials are sometimes referred to as "branched" polymers, and are known in the art. For example, they are generally described in U.S. Pat. No. 4,097,550; ADHESIVES AGE, Marrs et al, December, 1971, pp 15-20; and in RUBBER WORLD, Haws et al, January, 1973, pp 27-32, the patent and other disclosures being incorporated herein by reference.

Usually, several chains of the diene polymer (often three or more) extend from a coupling agent, with each chain terminating at its other end with a block of the vinyl aromatic polymer.

Examples of conjugated dienes which may be used to form the radial teleblock copolymer are 1,3-butadiene; isoprene; 2,3-dimethyl-1,3-butadiene; 1,3-pentadiene;

3-butyl-1,3-octadiene; and mixtures of these dienes, with 1,3-butadiene being most preferred.

The vinyl aromatic polymer for the radial teleblock material is usually prepared from compounds such as those designated by Formula I (Column 2) of U.S. Pat. No. 4,097,550, mentioned above. Examples of such compounds are styrene, chlorostyrene, vinyl toluene, 3-methylstyrene, 4-n-propylstyrene, 4-cyclohexylstyrene, 4-dodecylstyrene, 2-ethyl-4-benzylstyrene, 4-p-tolylstyrene, 4-(4-phenyl-n-butyl)styrene, 1-vinylnaphthalene, 2-vinylnaphthalene, as well as other alkyl, cycloalkyl, aryl, alkaryl, and aralkyl derivatives of any of these compounds. Furthermore, mixtures and/or copolymers of any of these compounds may be used to form the vinyl aromatic polymer.

The molecular weight of the radial teleblock copolymer is not especially critical, and preferably ranges from about 100,000 to about 350,000. It also preferably comprises from about 1 to about 50 parts by weight vinyl aromatic compound, and from about 99 to about 50 parts by weight conjugated diene, based on the weight of the entire teleblock copolymer. Various factors are to be considered in selecting an appropriate amount of coupling agent, such as the type of agent used, and the amount of organometallic initiator employed (the latter mentioned further below). Usually, relatively small amounts of coupling agent are preferred, for example, from about 0.1 to 1.0 parts by weight per 100 parts of resin.

Radial teleblock copolymers for the present invention are available commercially. They can also be prepared by techniques known in the art. For example, they can be made by polymerizing conjugated dienes (e.g., butadiene) and vinyl aromatic compounds, e.g., styrene, in the presence of an organometallic initiator such as n-butyllithium, thereby producing copolymers which contain an active metal atom such as lithium on one end of each of the polymer chains. These metal atom-terminated polymers can then be reacted with a coupling agent which has at least three active sites capable of reacting with the carbon-metal atom bonds on the polymer chains, and replacing the metal atoms on the chains. This results in polymers which have relatively long branches which radiate from a nucleus formed by the polyfunctional coupling agent. The teachings of U.S. Pat. No. 3,281,383, issued to Zelinski et al and incorporated herein by reference, describe such a method of preparation.

The coupling agents for the radial teleblock copolymers can be chosen from among polyepoxides, polyisocyanates, polyimines, polyaldehydes, polyketones, polyanhydrides, polyesters, polyhalides, and the like. These materials can contain two or more types of functional groups, such as the combination of epoxy and aldehyde groups, or isocyanate and halide groups, as also described in the above-referenced Zelinski et al patent.

Some preferred embodiments of this invention call for a radial teleblock copolymer of styrene and butadiene, with terminal blocks derived from styrene, and a coupling agent selected from epoxidized polybutadiene, SiCl4, or mixtures thereof. Examples of preferred epoxidized polybutadiene coupling agents are those designated commercially as Oxiron 2000 and Oxiron 2001.

Sometimes, the radial teleblock materials can be extended or diluted with mineral oil; e.g., light mineral oil. These extenders can comprise up to about 60% by weight of the radial teleblock material.

Commercial examples of radial teleblock copolymers suitable for this invention are the FINAPRENE products, Grades 401, 411, 414, 416, and 417, available from Fina Oil Company.

The amount of elastomeric material employed in compositions of the present invention depends on several factors, such as the particular monomers employed, as well as the desired level of various properties (for example, impact strength) for end products. Usually, about 1% by weight to about 30% by weight of elastomer is used, based on the weight of the entire composition. In more preferred embodiments, about 5% by weight to about 15% by weight is used.

Various additives which impart or enhance a variety of characteristics are sometimes included in the compositions described herein. Illustrative additives are flame retardants, drip retardants, dyes, pigments, colorants, lubricants, reinforcing agents, fillers, antistatic agents, heat stabilizers, ultraviolet light stabilizers, and plasticizers. Effective amounts of such additives are usually in the range, for each, of from about 0.1% by weight to about 50% by weight, based on the weight of the entire composition.

The compositions described herein can be prepared by conventional procedures well-known in the art. For example, the components mentioned above can be combined by any technique which results in an intimate blend. These techniques often involve the use of an extruder, which provides a substantial shearing force. Extruders which permit the addition of all of the ingredients through one port may be employed, or alternatively, those which contain multiple ports may be used. As an illustration, the capped PPE and a portion of the polyester may be added through an upstream port of a suitable extruder, while the polyester, radial teleblock copolymer, and any other ingredients are added through a downstream port. The extruder is sometimes vacuum-vented. Extrusion temperatures can be determined without undue experimentation by those skilled in processing thermoplastics, and are usually in the range of about 240° C. to about 320° C.

The compositions described above generally possess an unusual combination of properties, in melt form, and in the form of molded articles. Some of these properties are excellent tensile elongation, high melt flow, excellent chemical resistance and tensile strength, and good impact strength. The examples which follow illustrate some of the characteristics of the present invention.

EXAMPLES

The following materials were used in these examples:
CAPPED PPE (Component A)—The base resin was poly(2,6-dimethyl-1,4-phenylene ether), having an intrinsic viscosity in chloroform at 25° C. of 0.40 dl./g. Four percent (4%) by weight of an epoxytriazine compound of formula IV (percentage expressed as a percentage of the PPE) was dissolved in pyridine and then added to a solution of the PPE and toluene, with stirring. The solution was heated for 0.5 hour, after which the products were precipitated with methanol, filtered, washed with methanol, and then dried.

POLYESTER (Component B)—The polyester employed was a poly(butylene terephthalate), having a weight average molecular weight of about 103,000, and a dispersity of about 1.9, as determined by gel permeation chromatography. The polyester had an acid end group number of about 50 microequivalents/g, as determined by titration.

TAPERED LINEAR BLOCK COPOLYMER (Component C)—The material used was a styrene-butadiene-styrene block copolymer commercially available as Finaclear*TM 520, from Fina Oil & Chemical Company. The material contains about 27% butadiene and 73% by weight polystyrene (about 56% in block form, and 17% randomly linked to the butadiene). The weight-average molecular weight (absolute) of the copolymer is about 120,000 to 130,000, while the number-average molecular weight (absolute) is in the range of about 100,000 to 105,000. One polystyrene end block has a weight average molecular weight of about 25,000, while the other polystyrene end block has a molecular weight average of about 40,000 to 47,000.

Other relevant properties for Finaclear 520 are as follows:
- Melt Flow Index (g/10 min., via ASTM D-1238, Condition G): 7.5.
- Tensile Strength (ASTM D-638): 3,000 psi.
- Elongation (D-638): 200%.
- Flexural Modulus (ASTM D-790): 175 Mpsi.
- Izod Impact (ASTM D-256A, unnotched): 15 ft lb/in.
- Gardner Impact (ASTM D-3029): 150 in-lb.

BLOCK COPOLYMER—The impact modifier used in some of the samples was an unsaturated styrene-butadiene-styrene linear block copolymer, KRATON ®D-1102.

The compositions in the following examples were prepared by dry-blending and compounding the components, using a 30 mm Werner & Pfleiderer twin-screw extruder. Component levels are expressed in parts by weight (pbw), unless otherwise indicated.

The extrudate was quenched and pelletized, and the products were then molded into test specimens, using a Toshiba injection molding machine.

STABILIZERS—The compositions also contained three antioxidants (sulfur-based, hindered phenol, and phosphite-based), each at a level of about 0.2 to 0.3 pbw, based on 100 pbw resin.

EXAMPLE 1

The compositions in Table 1 were prepared as described above. Tests on molded pieces (using conventional ASTM procedures) resulted in the properties also set forth in the table:

TABLE 1

|  | Sample Number | | |
|---|---|---|---|
|  | 1* | 2 | 3 |
| Capped PPE (pbw) | 30 | 30 | 30 |
| Polyester | 60 | 60 | 60 |
| Triblock Copolymer(a) | — | — | 5 |
| Tapered Copolymer(c) | — | 10 | 5 |
| PROPERTIES | | | |
| Izod Impact Strength (Notched) (ft-lb/in) | 0.24 | 0.54 | 3.3 |
| Dynatup Impact Strength(b) (Room Temp.) (ft-lbs) | 3B | 24B | 42D |
| Dynatup Impact Strength (−20° F.) (ft-lbs) | 4B | 5B | 50D |
| Flexural Modulus (Kpsi) | 386 | 376 | 332 |
| Flexural Strength (Kpsi) | 14.9 | 14.7 | 12.8 |
| Tensile Yield (Kpsi) | 9.2 | 9.6 | 8.3 |
| Tensile Elongation (%) (at break) | 8 | 24 | 45 |

*Control
(a) = Styrene-Butadiene-Styrene Linear Block Copolymer
(b) = "D" = Ductile, "B" = Brittle
(c) = FINACLEAR 520

The data in Table 1 demonstrate that compositions of the present invention generally exhibit a variety of excellent property characteristics. For example, Izod impact strength and tensile elongation are greatly enhanced in these compositions.

Those skilled in the chemical arts recognize that modifications and variations of the present invention are possible in light of the above teachings. It is to be understood, therefore, that changes may be made in particular embodiments described above which are within the full intended scope of the invention as defined by the claims which follow.

All of the above-mentioned patents and publications are incorporated herein by reference.

I claim:

1. A thermoplastic composition comprising:
   A) polyphenylene ether capped with an epoxytriazine compound;
   B) thermoplastic polyester resin; and
   C) a linear, tapered, block copolymer comprising blocks of $A^1$ and $B^1$, wherein $A^1$ is at least one polymerized vinyl aromatic block, and $B^1$ is a hydrogenated, partially hydrogenated, or non-hydrogenated block derived from at least one polymerized conjugated diene,
   said at least one polymerized vinyl aromatic block being present in the range of from about 50% to about 90% by weight, based on the weight of the tapered copolymer.

2. The composition of claim 1 wherein the polyphenylene ether comprises a plurality of structural units of the formula:

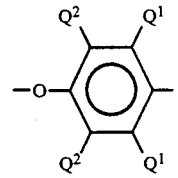

wherein each $Q^1$ is independently halogen, primary or secondary lower alkyl, phenyl, haloalkyl, aminoalkyl, hydrocarbonoxy, or halohydrocarbonoxy, wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$.

3. The composition of claim 2 wherein the polyphenylene ether is poly(2,6-dimethyl-1,4-phenylene ether).

4. The composition of claim 2 wherein the polyphenylene ether is derived from a monomer selected from the group consisting of 2,6-dimethyl phenol; 2,3,6-trimethyl phenol, and mixtures thereof.

5. The composition of claim 2 wherein the polyester comprises structural units of the formula

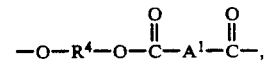

wherein each $R^4$ is independently a divalent aliphatic, alicyclic, or aromatic hydrocarbon group or polyoxyalkylene group, and $A^1$ is a divalent aromatic group.

6. The composition of claim 5 wherein the polyester is a poly(alkylene dicarboxylate), or mixtures of at least two poly(alkylene dicarboxylate)'s.

7. The composition of claim 6 wherein the poly(alkylene dicarboxylate) is either poly(ethylene terephthalate), poly(butylene terephthalate), or mixtures thereof.

8. The composition of claim 5 wherein the polyester further comprises units of the formula

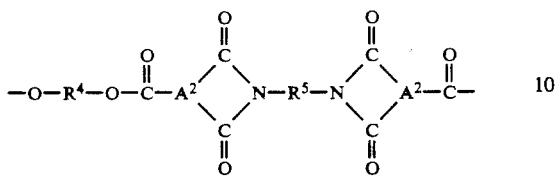

wherein $R^5$ is a polyoxyalkylene group, and $A^2$ is a trivalent aromatic group.

9. The composition of claim 1, wherein the $A^1$ block is derived from a monomer selected from the group consisting of styrene, alpha-methyl styrene, para-methyl styrene, vinyl toluene, vinyl xylene, and mixtures of such monomers.

10. The composition of claim 9 wherein the $B^1$ block is derived from a monomer selected from the group consisting of butadiene, isoprene, ethylene, butylene, 1,3-pentadiene, 2,3-dimethyl butadiene, and combinations thereof.

11. The composition of claim 1 wherein the amount of component C present is in the range of about 1% by weight to about 20% by weight, based on the weight of the entire composition.

12. The composition of claim 11 wherein the amount of component C present is in the range of about 5% by weight to about 15% by weight.

13. The composition of claim 1, further comprising effective amounts of at least one additive selected from the group consisting of flame retardants, drip retardants, plasticizers, stabilizers, antistatic agents, fillers, reinforcing agents, lubricants, colorants, dyes, and pigments.

14. The composition of claim 1, wherein the weight ratio of component (A) to component (B) ranges from about 60:40 to about 20:80.

15. The composition of claim 10,
wherein said linear, tapered block copolymer is present in the range of from about 1% by weight to about 20% by weight, based on the weight of the entire composition.

16. The composition of claim 15,
wherein said linear, tapered, block copolymer is present in the range of from about 5% by weight to about 15% by weight, based on the weight of the entire composition.

17. The composition of claim 16,
wherein said linear, tapered, block copolymer comprises from about 70% to about 80% by weight polymerized vinyl aromatic material and from about 30% to about 20% by weight non-hydrogenated polymerized conjugated diene monomer.

18. The composition of claim 17,
wherein said polymerized vinyl aromatic material comprises polystyrene, and
said non-hydrogenated conjugated diene monomer comprises polybutadiene.

19. A thermoplastic composition comprising:
I) the reaction product of an epoxytriazine-functionalized polyphenylene ether polymer with a thermoplastic polyester, and
II) at least one tapered, linear, block copolymer comprising blocks of $A^1$ and $B^1$, wherein $A^1$ is at least one polymerized vinyl aromatic block, and $B^1$ is a hydrogenated, partially hydrogenated, or non-hydrogenated block derived from at least one polymerized conjugated diene,
said at least one polymerized vinyl aromatic block being present in the range of from about 50% to about 90% by weight, based on the weight of the tapered copolymer.

20. The composition of claim 19, wherein the polyphenylene ether is derived from a monomer selected from the group consisting of 2,6-dimethyl phenol; 2,3,6-trimethyl phenol; and mixtures thereof; and wherein the polyester is selected from the group consisting of poly(alkylene dicarboxylates), elastomeric polyesters, polyarylates, polyester copolymers, and mixtures of these materials.

21. The composition of claim 20, wherein the poly(alkylene dicarboxylate) is selected from the group consisting of poly(ethylene terephthalate), poly(butylene terephthalate), and mixtures thereof.

22. The composition of claim 21, wherein the epoxytriazine compound is selected from the group consisting of diglycidyl chlorocyanurate, n-butyl glycidyl chlorocyanurate, and mesityl glycidyl chlorocyanurate.

* * * * *